Oct. 25, 1955

R. G. PIETY 2,721,617

METHOD OF SEISMIC PROSPECTING

Filed June 12, 1950

INVENTOR.
R. G. PIETY

BY Hudson & Young

ATTORNEYS

United States Patent Office 2,721,617
Patented Oct. 25, 1955

2,721,617
METHOD OF SEISMIC PROSPECTING

Raymond G. Piety, Bartlesville, Okla., assignor to Phillips Petroleum Company, a corporation of Delaware Application June 12, 1950, Serial No. 167,682

3 Claims. (Cl. 181—.5)

This invention relates to a method of seismic prospecting. In other aspect, it relates to a method of detonating an explosive charge at a shot point.

In seismic prospecting, an explosive charge is detonated at a location referred to as the "shot point," the resulting explosion producing seismic waves which are, in part, reflected from subterranean strata to the surface where they are picked up by electro-mechanical transducers, such as seismometers. Ordinarily, several seismometers are placed in a predetermined geometric array, and the recordings produced thereby enable valuable information to be obtained concerning the nature and extent of the subterranean formations. Heretofore, in detonating the charge, a large amount of energy has been lost through mechanical work done by the explosive charge in shattering rock formations adjacent the charge and, due to the relatively small diameter of the shot hole, the effective radius of the explosion is rather small with the result that only a relatively small portion of the energy of the explosion is utilized in producing seismic waves. In the past, this has resulted in the necessity of drilling the shot holes to a considerable depth, which is an expensive and time consuming operation. This results from the fact that the charge is ordinarily surrounded by an incompressible medium, such as water, and the effective radius of the explosion is determined by the outer boundary of the incompressible material, that is, by the sides of the shot hole.

In accordance with my invention, the size of the shot hole is deliberately enlarged prior to the detonation of the charge for producing seismic waves by a preliminary explosion which substantially increases the size of the shot hole. In particular, where soft formations are encountered, the preliminary explosion produces a compacting of the sides of the hole, this compacting resulting in an increase of the volume of the hole without the expenditure of a large amount of energy in shattering rock. When this enlarged hole is filled with incompressible material, such as water, the effective radius of the explosive charge is substantially increased, with resultant increase in the efficiency with which the energy of detonation is converted into seismic waves. I have further discovered that, when the preliminary explosion is utilized to enlarge a hole, the same effect may be obtained by drilling a plurality of shallow holes and exploding a relatively small charge in each hole, rather than detonating a relatively large charge in a deep hole. The arrangement of this plurality of holes is not critical but they should be spaced sufficiently close together as to provide effectively a point source for the explosion, insofar as the recording seismometers are concerned.

It is an object of the invention to provide a method of utilizing the energy in explosive material more efficiently for producing seismic waves.

It is a further object to provide a method whereby a preliminary enlarging and compacting of a shot hole is produced prior to the detonation of a charge to generate seismic waves to be recorded.

It is a still further object to utilize several explosive charges in shallow holes rather than a single large charge in a deep hole.

Various other objects, advantages and features of the invention will become apparent from the following detailed description taken in conjunction with the accompanying drawings, in which.

Figure 1:
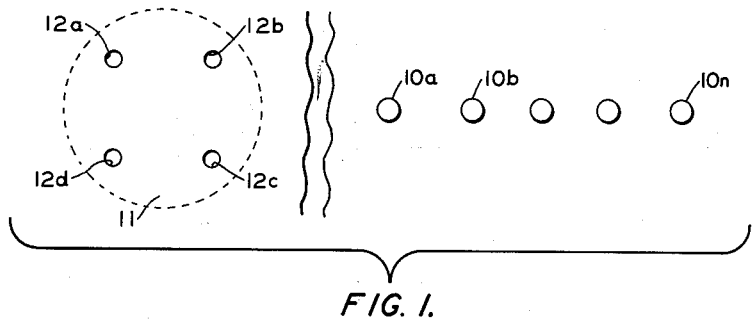
Figure 1 is a diagrammatic view of the manner in which explosive charges and seismometers may be positioned in accordance with the principles of this invention.

Referring now to Figure 1, a plurality of seismometers $10a$, $10b$ . . . $10n$ are spaced along a line extending to a shot point 11 at which several explosive charges $12a$ to $12d$ are positioned in a desired spaced arrangement. The distance between the charges is not critical nor is their arrangement so long as they are sufficiently close together that the seismic waves produced by the explosions at the several locations effectively emanate from a point, insofar as their effect upon the seismometer stations is concerned. In a typical case, the charges 12 are spaced at the corner of a square having a length of thirty feet along each side thereof.

Figures 2, 3:
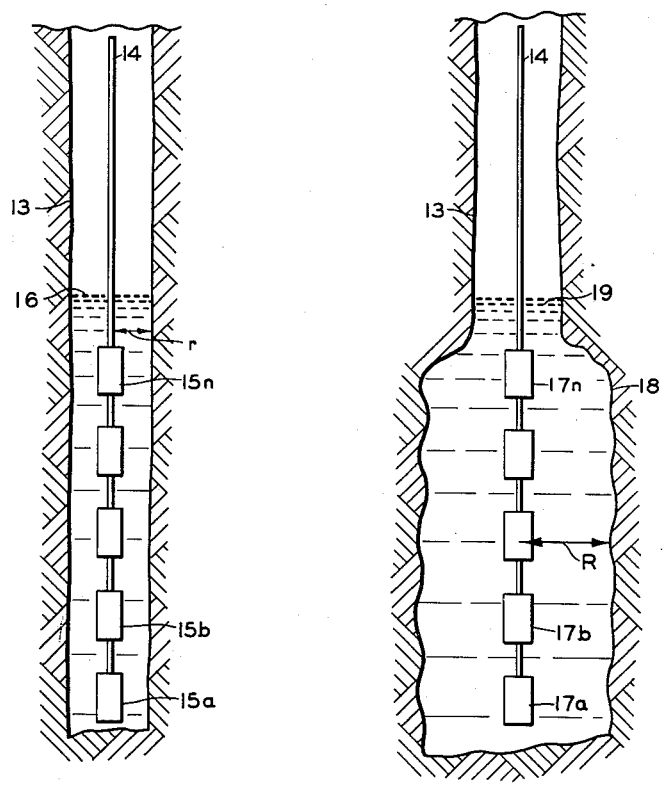
Figure 2 is a vertical sectional view of a shot hole before the initial enlargement and compacting thereof by a preliminary explosive charge.
Figure 3 is a vertical sectional view of an enlarged hole.

At each of the charged locations, a shallow hole is drilled, as indicated by reference character 13, and a preliminary explosive charge is lowered into the hole by a string or cable 14, this charge consisting of several quantities of powder $15a$, $15b$ . . . $15n$ arranged longitudinally of the string 14. The hole contains water 16 or other incompressible liquid, the surface of the liquid being above the uppermost quantity $15n$ of explosive material.

Where the explosive charges 15 are detonated in a soft formation, the preliminary explosion produced thereby compacts the formation walls adjoining the lower part of the hole and enlarges them in the manner illustrated by Figure 3. Thereupon, a second charge of explosive material is lowered into the hole by string 14, this charge consisting of several spaced quantities $17a$, $17b$ . . . $17n$ of explosive material arranged longitudinally along the string 14. The enlarged lower portion 18 of the hole is filled with water 19 or other incompressible material so that the upper surface of the water is positioned above the uppermost explosive quantity $17n$. It will be understood that a similar procedure is followed at each of the shot holes positioned at the location 11, the charges 17 at each of these locations being detonated simultaneously to provide a seismic signal which is reflected from subterranean strata and produces signals representative of the seismic waves at the seismometers 10.

Due to the preliminary enlargement of the hole, the energy of the explosion is more efficiently transformed into seismic waves. In Figure 3, the effective radius of the explosion is approximately the radius R of the enlarged hole whereas, in Figure 2, the effective radius $r$ is much smaller due to the decreased diameter of the hole. This increased radius of action, which is due to the placing of incompressible material in the hole, considerably increases the efficiency with which the explosive energy is transformed into seismic waves. Although best results are obtained where the preliminary charges are detonated in a soft formation, so that the hole is enlarged by a compacting action rather than by pulverizing rock, nevertheless improved results are also obtained in harder formations due to the increased effective radius of the explosion. Where several charges are placed in these enlarged holes and detonated simultaneously, each hole may be made of much less depth than when the entire charge is detonated in one hole. In many oil producing areas, it is much cheaper and more simple to drill several shallow holes than one deep hole and, in addition, the total quantity of explosive material can be considerably reduced.

In a specific example, four shot holes were positioned at the corners of a thirty foot square, each hole being approximately one hundred feet deep. The preliminary charge in each hole was a string of powder four feet long having a weight of two and one-half pounds per linear foot, and the diameter of the hole was increased by the preliminary explosion from six inches to twenty-nine inches, the enlargement of the hole being due to movement of the earth and compacting thereof outwardly from the center of the explosion rather than to the pulverizing or breaking up of rock. After the preliminary enlargement of the hole, new charges of fifty pounds were placed in each of the four holes and detonated simultaneously, producing a seismic wave whose energy content was up to four times as much as that obtained from an explosive charge of the same total quantity of material in a four hundred foot hole. Since the quantity of explosive in each hole is much smaller, it was possible to use the same set of holes for several different explosive charges, which is oftentimes impossible when a single large charge is exploded in a deep hole.

While the invention has been described in connection with a present, preferred embodiment thereof, it is to be understood that this description is illustrative only and is not intended to limit the invention, the scope of which is defined by the appended claims.

I claim:

1. The method of producing seismic waves by detonation of an explosive charge which comprises drilling a plurality of shot holes at a predetermined location, said holes being spaced sufficiently closely as to provide a point source of seismic waves, introducing a string including a plurality of longitudinally spaced explosive charges of relatively small size into each such shot hole, detonating said explosive charges in each shot hole to enlarge same in a radial direction along a substantial length of the shot hole, thereafter introducing another string including a plurality of longitudinally spaced explosive charges of relatively large size into each shot hole, and simultaneously detonating the last-mentioned charges of explosive material to produce seismic waves.

2. The method of producing seismic waves by detonation of an explosive charge in a soft formation which comprises drilling a plurality of shot holes at a predetermined location in said formation, said holes being spaced sufficiently closely as to provide a point source of seismic waves, introducing a string of longitudinally spaced charges of explosive material of relatively small size into each such shot hole, detonating said charges in each shot hole to enlarge same by a compacting action of the soft formations adjoining each shot hole along a zone substantially coextensive in a longitudinal direction with the length of said string of explosive charges, thereafter introducing a string of longitudinally spaced charges of explosive material of relatively large size into the enlarged portion of each shot hole, and simultaneously detonating the last-mentioned charges of explosive material to produce seismic waves.

3. The method of producing seismic waves by detonation of an explosive charge in a soft formation which comprises drilling a plurality of shot holes at a predetermined location in said formation, said holes being spaced sufficiently closely as to provide a point source of seismic waves, introducing an incompressible liquid into each such shot hole, introducing a string consisting of a plurality of longitudinally spaced charges of explosive material of relative small size into each such shot hole, detonating said charges in each shot hole to enlarge same by a compacting action of the soft formations adjoining each shot hole along a zone substantially coextensive in a longitudinal direction with the length of said string of explosive charges, thereafter introducing a string consisting of a plurality of longitudinally spaced charges of explosive material of relatively large size into the enlarged portion of each shot hole, introducing an additional quantity of incompressible liquid into each enlarged shot hole, and simultaneously detonating said last-mentioned charges of explosive material to produce seismic waves.

References Cited in the file of this patent

UNITED STATES PATENTS

| Number | Name | Date |
|---|---|---|
| 2,028,286 | Johnson | Jan. 21, 1936 |
| 2,049,236 | Weatherby | July 28, 1936 |
| 2,064,451 | Voorhees | Dec. 15, 1936 |
| 2,073,493 | Salvatori | Mar. 9, 1937 |
| 2,384,851 | Reichert | Sept. 18, 1945 |
| 2,550,563 | Hughes | Apr. 24, 1951 |
| 2,556,299 | Scott | June 12, 1951 |
| 2,630,188 | Hawkins et al. | Mar. 3, 1953 |